US005373695A

United States Patent [19]

Aigner et al.

[11] Patent Number: 5,373,695

[45] Date of Patent: Dec. 20, 1994

[54] GAS TURBINE COMBUSTION CHAMBER WITH SCAVENGED HELMHOLTZ RESONATORS

[75] Inventors: Manfred Aigner, Wettingen; Raphael Urech, Hallwil; Hugo Wetter, Buchs, all of Switzerland

[73] Assignee: Asea Brown Boveri Ltd., Baden, Switzerland

[21] Appl. No.: 132,185

[22] Filed: Oct. 6, 1993

[30] Foreign Application Priority Data

Nov. 9, 1992 [EP] European Pat. Off. ........ 92119124.3

[51] Int. Cl.[5] ............ F02C 3/05

[52] U.S. Cl. ............ 60/39.36; 60/725

[58] Field of Search ............ 60/39.36, 39.37, 725, 60/747, 752; 181/213, 229, 286; 431/114

[56] References Cited

U.S. PATENT DOCUMENTS

| | | | |
|---|---|---|---|
| 2,881,337 | 4/1959 | Wall . | |
| 3,850,261 | 11/1974 | Hehmann et al. | 181/286 |
| 3,978,662 | 9/1976 | DuBell et al. . | |
| 4,012,902 | 3/1977 | Schirmer . | |
| 4,077,205 | 3/1978 | Pane et al. . | |
| 4,305,255 | 12/1981 | Davies et al. | 60/746 |
| 4,944,362 | 7/1990 | Motsinger et al. | 181/213 |
| 5,081,844 | 1/1992 | Keller et al. | 60/39.37 |
| 5,141,391 | 8/1992 | Acton et al. | 415/119 |

FOREIGN PATENT DOCUMENTS

| | | |
|---|---|---|
| 0387532 | 9/1990 | European Pat. Off. . |
| 2570129 | 3/1986 | France . |

*Primary Examiner*—Timothy S. Thorpe

*Attorney, Agent, or Firm*—Burns, Doane, Swecker & Mathis

[57] ABSTRACT

In a gas turbine combustion chamber having an annular combustion space, the combustion chamber inlet is equipped with a plurality of burners, which are uniformly distributed in the peripheral direction and are fastened to a front plate. Scavenged Helmholtz resonators (21) consisting of supply tube (51), resonance volume (50) and damping tube (52) are arranged in the region of the burners. The damping tubes (52) are designed so as to be exchangeable, for which purpose the walls of the combustion space are provided with a manhole.

5 Claims, 2 Drawing Sheets

FIG. 1
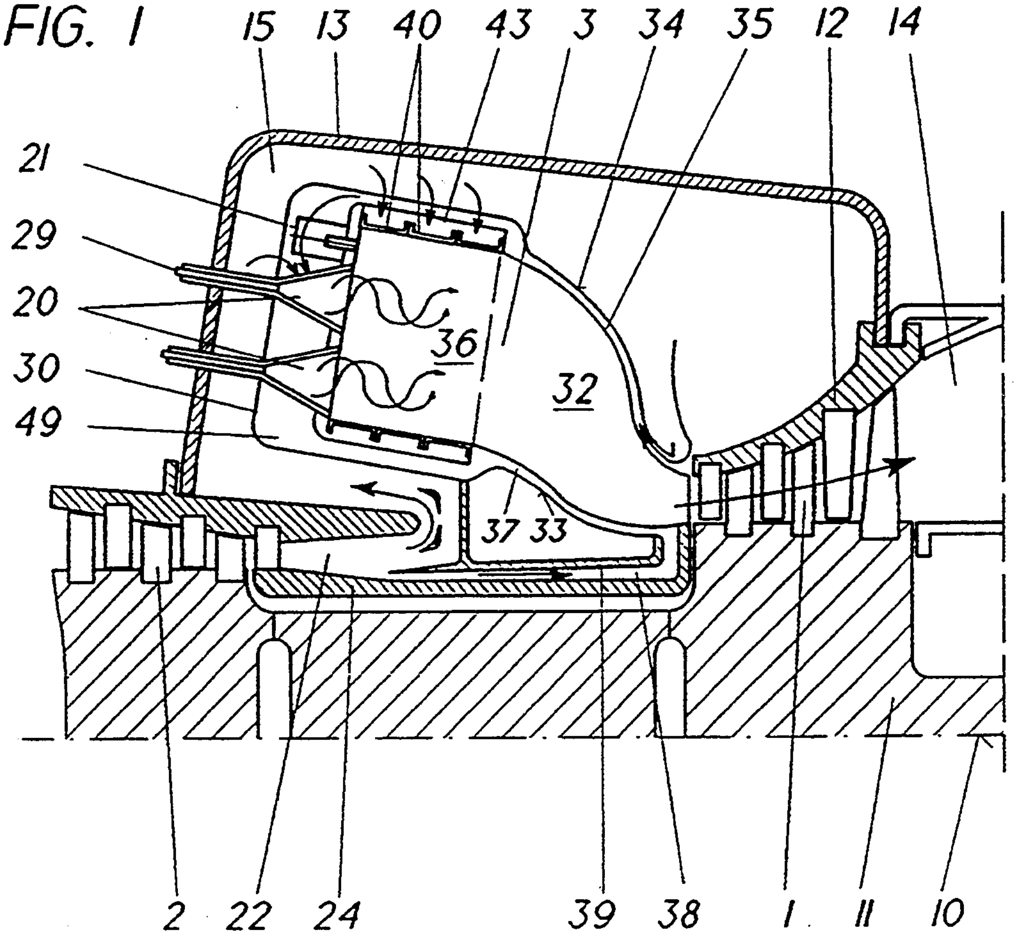
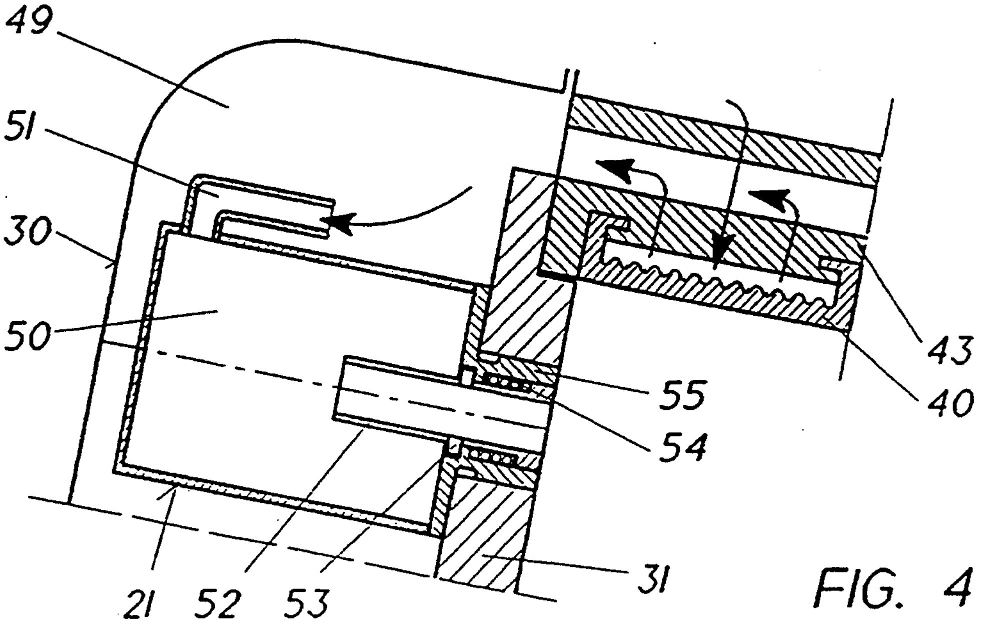
FIG. 4

GAS TURBINE COMBUSTION CHAMBER WITH SCAVENGED HELMHOLTZ RESONATORS

BACKGROUND OF THE INVENTION

1. Field of the Invention

The invention relates to a gas turbine combustion chamber having an annular combustion space whose walls extend from the combustion chamber inlet to the inlet to the gas turbine, and in which the combustion chamber inlet is equipped with a plurality of burners evenly distributed in the peripheral direction, which burners are fastened to a front plate.

2. Discussion of Background

The so-called "weak premixing combustion" has, in the recent past, become general for the low-pollutant combustion of a gaseous or liquid fuel. In this, the fuel and the combustion air are premixed as evenly as possible and are only then supplied to the flame. If this is carried out with a large excess of air, as is usual in the case of gas turbine installations, relatively low flame temperatures occur and this in turn leads to the desired, low level of formation of nitrogen oxides.

Combustion chambers of the type mentioned at the beginning are known from EP-A1-387 532. In this, the front plate is formed by a single wall on which are arranged premixing burners of the double-cone type.

Modern highly-loaded gas turbines demand increasingly complex and effective cooling methods. In order to achieve low $NO_x$ emission, attempts are made to direct an increasing proportion of the air through the burners themselves. This necessity to reduce the cooling air flows is also, however, due to reasons associated with the increasing hot gas temperature at the inlet of a modern gas turbine. Because the cooling of the other installation parts such as blading, machine shaft, etc. must also meet increasingly stringent requirements and because the hot gas temperatures, which continue to be increased in the interest of a high thermal efficiency, also lead directly to a greatly increased thermal loading on the combustion chamber walls, it is necessary to be very economical with the combustion chamber cooling air. These requirements generally lead to multi-stage cooling techniques, in which the pressure loss coefficient, i.e. the overall pressure drop caused by the cooling divided by a stagnation pressure at the cooling air inlet into the combustion chamber, can be quite high.

Gas turbine combustion chambers with air-cooled flame tubes are likewise known, for example from U.S. Pat. Nos. 4,077,205 or 3,978,662. The flame tube is essentially constructed of wall parts overlapping in the axial direction of the turbine. On their side facing away from the combustion space, each of the wall parts has a plurality of inlet openings distributed over the periphery. These inlet openings are used to introduce air into a distribution space arranged in the flame tube and communicating with the combustion space. In the case of the cooling system in these specifications, the respective flame tube has a lip which extends over the slot through which the cooling air film emerges. This cooling air film is to adhere to the wall of the flame tube, in order to form a cooling barrier layer for the flame tube.

The known gas turbine combustion chambers mentioned above have the disadvantage that the air consumption for cooling purposes is much too high and that, because the cooling air is fed into the flame tube interior downstream of the flame, this air is not available for the actual combustion process. The combustion chamber cannot, in consequence, be operated with the high excess air ratio necessary.

In the case of conventional combustion chambers, the cooling generally plays an extremely important role in the noise damping of the combustion chamber. The reduction in the cooling air mass flow mentioned above, in association with a greatly increased pressure loss coefficient for the overall combustion chamber wall cooling, now leads to an almost complete suppression of the noise damping. This development has led to an increasing vibration level in modern low $NO_x$ combustion chambers.

SUMMARY OF THE INVENTION

Accordingly, one object of the invention is to provide a novel gas turbine combustion chamber of the type mentioned at the beginning which, for minimum cooling air consumption, substantially increases the noise damping of a combustion chamber by damping the thermoacoustically excited vibrations.

In accordance with the invention, this is achieved by arranging scavenged Helmholtz dampers, consisting of supply tube, resonance volume and damping tube, in the region of the burners.

The advantage of the invention may be seen, inter alia, in that the thermoacoustic vibrations created in the flame fronts are particularly intensely damped because the Helmholtz dampers are in the vicinity of the combustion zones.

It is particularly expedient for the damping tubes in the Helmholtz dampers to be designed so as to be exchangeable and, for this purpose, for the walls of the combustion space to be provided with a manhole. By this means, the dampers can be tuned, without the necessity diassembling of the machine, to the combustion space vibration which has been detected and has to be damped.

BRIEF DESCRIPTION OF THE DRAWINGS

A more complete appreciation of the invention and many of the attendant advantages thereof will be readily obtained as the same becomes better understood by reference to the following detailed description, of a single-shaft axial flow gas turbine, when considered in connection with the accompanying drawings, wherein:

FIG. 1 shows a partial longitudinal section of the gas turbine;

FIG. 4 shows a longitudinal section of a Helmholtz resonator.

DESCRIPTION OF THE PREFERRED EMBODIMENTS

Figure 2:
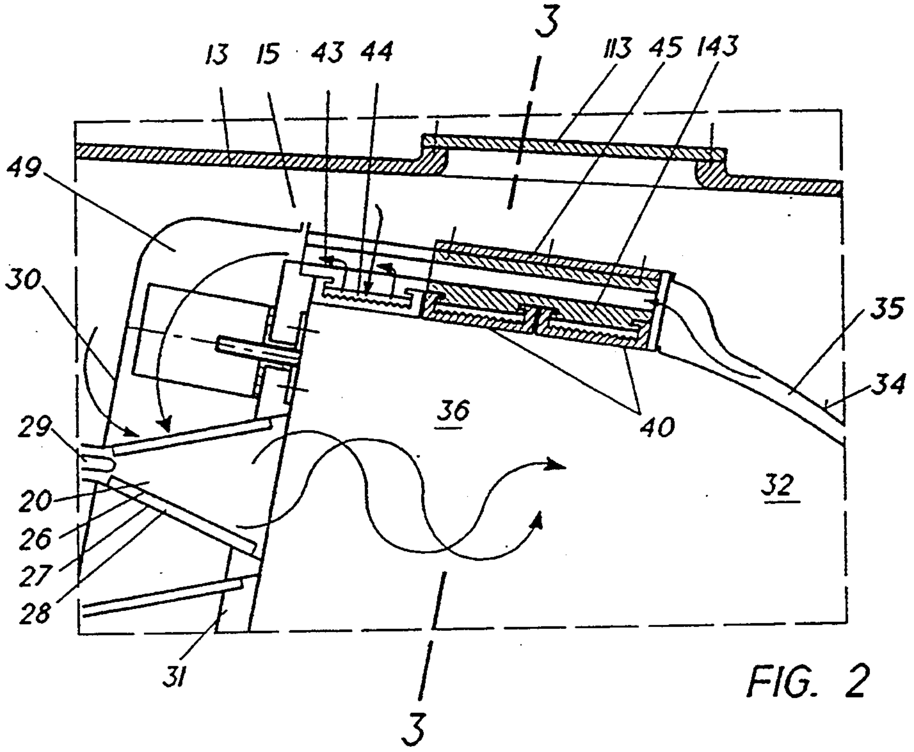
FIG. 2 shows an enlarged detail of the primary zone of the combustion chamber.

Referring now to the drawings, wherein like reference numerals designate identical or corresponding parts throughout the several views, wherein the flow direction of the working media is indicated by arrows and wherein only the elements essential to understanding the invention are shown (parts of the installation not shown are, for example, the complete exhaust gas casing, with exhaust gas pipe and chimney, and the inlet parts of the compressor section), the installation, of which only the half located above the machine center line 10 is represented in FIG. 1, consists essentially—at the gas turbine end (1)—of the rotor 11, which is bladed with rotor blades, and the vane carrier 12, which is equipped with guide vanes. The vane carrier 12 is suspended by means of protrusions in appropriate accommodation features in the turbine casing 13. The exhaust gas casing 14 is flanged onto the turbine casing 13.

In the case represented, the turbine casing 13 likewise includes the collecting space 15 for the compressed combustion air. From this collecting space, part of the combustion air passes directly, in the direction of the arrows, through a perforated cover 30 into the annular combustion chamber 3, which in turn opens into the turbine inlet, i.e. upstream of the first guide vane row. The compressed air from the diffuser 22 of the compressor 2 passes into the collecting space. Only the last four stages of the compressor are represented. The rotor blading of the compressor and the turbine are seated on the common shaft 11 whose center line represents the longitudinal axis 10 of the gas turbine unit.

At its inlet end, the combustion chamber 3 is equipped with premixing burners 20 such as are known, for example, from EP-A1-387 532. Such a premixing burner, shown only diagrammatically in FIG. 2, is a so-called double-cone burner. It consists essentially of two hollow, conical partial bodies 26, 27 which are interleaved in the flow direction. The respective center lines of the two partial bodies are offset relative to one another. In their longitudinal extent, the adjacent walls of the two partial bodies form tangential slots 28 for the combustion air which, in this way, passes into the inside of the burner. A fuel nozzle 29 for liquid fuel is arranged there. The fuel is injected at an acute angle into the hollow cones. The resulting conical liquid fuel profile is enclosed by the tangentially entering combustion air. The concentration of the fuel is continuously reduced in the axial direction because of mixing with the combustion air. The-burner can also be operated with gaseous fuel. For this purpose, gas inlet openings distributed in the longitudinal direction are provided in the region of the tangential slots in the walls of the two partial bodies. When operating on gas, the formation of a mixture with the combustion air has already commenced in the zone of the inlet slots 28. It is evident that mixed operation with both types of fuel is possible in this way. A fuel concentration which is as homogeneous as possible over the annular admission cross section is produced at the burner outlet. A defined cap-shaped reverse flow zone occurs at the burner outlet and ignition occurs at the apex of this zone.

During combustion, the combustion gases reach very high temperatures and this makes particular demands on the combustion chamber walls which have to be cooled. This applies to an even greater extent when so-called low $NO_x$ burners, for example the premixing burners used as a basis here, are used. These require large flame tube surfaces for relatively modest cooling air quantities. The annular combustion space extends downstream of the mouths of the burners as far as the turbine inlet. It is bounded on both the inside and the outside by the walls to be cooled, which, as a rule, are designed as self-supporting structures.

The present combustion chamber is equipped with 72 of the burners 20 mentioned. Their arrangement can be seen from FIG. 3, which shows a detail covering one quarter of a circle. Two burners are arranged radially one above the other on each front segment 31. 36 of these front segments are butted together and form a closed circular ring which, in this way, forms a heat shield. The two burners of respectively adjacent front segments are offset radially. This means that the radially outer burner of each second front segment is directly bounded by the outer annular wall of the combustion chamber, as can also be seen from FIG. 3. The radially inner burners of the other front segments are, in consequence, arranged in the immediate vicinity of the inner annular wall. This provides a non-uniform thermal loading over the periphery of the corresponding annular walls.

For noise damping of the combustion chamber, a scavenged Helmholtz resonator 21 is now accommodated at the free end of each front segment 31 not occupied by a burner. As shown in FIG. 4, such a Helmholtz damper consists essentially of the actual resonance volume 50, an air inlet opening to the Helmholtz volume which is here configured as the supply tube 51, and a damping tube 52 opening into the combustion chamber interior. The damper receives the scavenging air from the inlet space 49.

The functional capability of the Helmholtz resonator is ensured by dimensioning the supply tubes 51 in such a way that they subject the airflow to a relatively high pressure drop. On the other hand, the air reaches the inside of the combustion chamber through the damping tubes 52 with a low residual pressure drop. The limit to the pressure drop in the damping tubes is provided by the need to ensure an adequate airflow into the combustion chamber even in the case of a non-uniform pressure distribution on the inside the combustion chamber wall. Obviously, hot gas must not penetrate in the reverse direction into the Helmholtz resonator at any point.

The selection of the magnitude of the Helmholtz volume 50 follows from the requirement that the phase angle between the fluctuations in the damping air mass flows through the supply and damping tubes shall be greater than or equal to $\pi/2$. In the case of a harmonic vibration with a specified frequency on the inside of the combustion chamber wall, this requirement means that the volume must be at least sufficiently large for the Helmholtz frequency of the resonator, which is formed by the volume 50 and the openings 51 and 52, to attain a frequency which is at least that the combustion chamber vibration to be damped. It also follows from this that the volume of the Helmholtz resonator used should preferably be designed for the lowest natural frequency of the combustion space. It is also possible to select an even larger volume. This achieves the effect that a pressure fluctuation on the inside of the combustion space leads to a strongly counter-phase fluctuation of the air mass flow because, of course, the fluctuations of the damping air mass flows through the supply tubes and the damping tubes are no longer in phase.

The supply tube 51 determines the pressure drop. The velocity at the end of the supply tube adjusts itself in such a way that the dynamic pressure of the jet, together with the losses, corresponds to the pressure drop over the combustion chamber. The average flow velocity in the damping tube can, in the present case of a gas turbine combustion chamber, be typically 2 to 4 m/s for ideal design. It is therefore very small in comparison with the vibration amplitude, and this means that the air particles move forwards and backwards in a pulsating manner in the damping tube. On the other hand, the air permitted to pass through is only sufficient to avoid any significant heating of the resonator. Heating due to radiation from the region of the combustion chamber would have the consequence that the frequency would not remain stable. The scavenging should therefore only remove the heat quantity which is radiated into the resonator.

The location of the damping is decisive for the stabilization of a thermoacoustic vibration. The strongest excitation occurs when the reaction rate and the pressure perturbation vibrate in phase. The strongest reaction rate occurs, as a rule, in the vicinity of the center of the combustion zone. In consequence, the highest reaction rate fluctuation will also be there—if such a fluctuation occurs. The present arrangement of the dampers at the radially outer and radially inner ends of the front segments has favorable effects in this respect because, in this way, the respective damper is surrounded by three burners.

The casing of the Helmholtz damper is screwed into the respective front segment 31 from the direction of the inlet space 49 by means of a hollow threaded spigot 55. The damping tube 52 protruding into the volume 50 is configured so that it can be exchanged. For this purpose, it penetrates the hollow threaded spigot from the combustion space and is fastened into the end of the resonator by means of a bayonet fitting 53. Spring means 54 ensure a non-positive contact between the bayonet fitting and the end of the resonator.

During the commissioning of the combustion chamber, the frequency spectrum is measured with the Helmholtz dampers closed by blind flanges. The necessary length and internal diameter of the damping tubes can be calculated, for a specified damping volume, from the vibration which has to be damped. The tubes determined by this means are subsequently fitted with the combustion chamber shut down. It is evident that a plurality of critical vibrations of different frequencies can be damped in this way by installing different damper tubes.

So that the Helmholtz dampers can be reached from the outside, it is necessary for the generally cooled walls of the combustion space to be provided with a manhole. In the present case, these walls are of a particular type so as not to impair the cooling.

The thermally highly-loaded inside of the combustion chamber is in fact subdivided into two zones whose walls are cooled in different ways.

A secondary zone 32, located downstream and opening into the turbine inlet, is bounded by a double-walled flame tube. On both its inner ring 33 and its outer ring 34, it consists of a flangeless, welded sheet-metal construction which is held together by means of distance pieces (not shown). Both rings 33 and 34 are open at their turbine end and there form the inlet for the cooling air. The annular space 35 between the double wall of the outer ring 34 receives the air directly from the collecting space 15, as may be seen from FIG. 1. The air flows, in counterflow to the combustion chamber flow, in the direction of the primary zone 36 and applies efficient convection cooling. The annular space 37 between the double wall of the inner ring 33 is supplied with air from a hub diffuser 38. This hub diffuser, which is connected to the compressor diffuser 22, is bounded on one side by a drum cover 24 and, on the other side, by a ring shell 39. The latter is connected to the drum cover 24 by means of ribs (not shown). In this annular space 37, the air again flows, in counterflow to the combustion chamber flow, in the direction of the primary zone 36.

The cooling of the highly-loaded primary zone walls is carried out by means of individually cooled cooling segments 40. These cooling segments, arranged in series in the peripheral direction and in the axial direction, form the wall bounding the flow in the primary zone 36 over the whole of its axial extent. The individual cooling has the advantage of low pressure drop.

The thermally highly-loaded cooling segments 40 consist of a highly heat resistant precision cast alloy. In the peripheral direction, they are each suspended by means of two lugs 42, equipped with support teeth, in corresponding grooves in a support structure, in a similar manner to that, for example, by which the roots of guide vanes are fastened in guide vane carriers. Again in a manner similar to guide vane carriers, this support structure, referred to below as segment carrier 43, consists of two cast half-shells with a horizontal split plane and claw supports (not shown) by means of which it is supported in the turbine casing.

Figure 3:
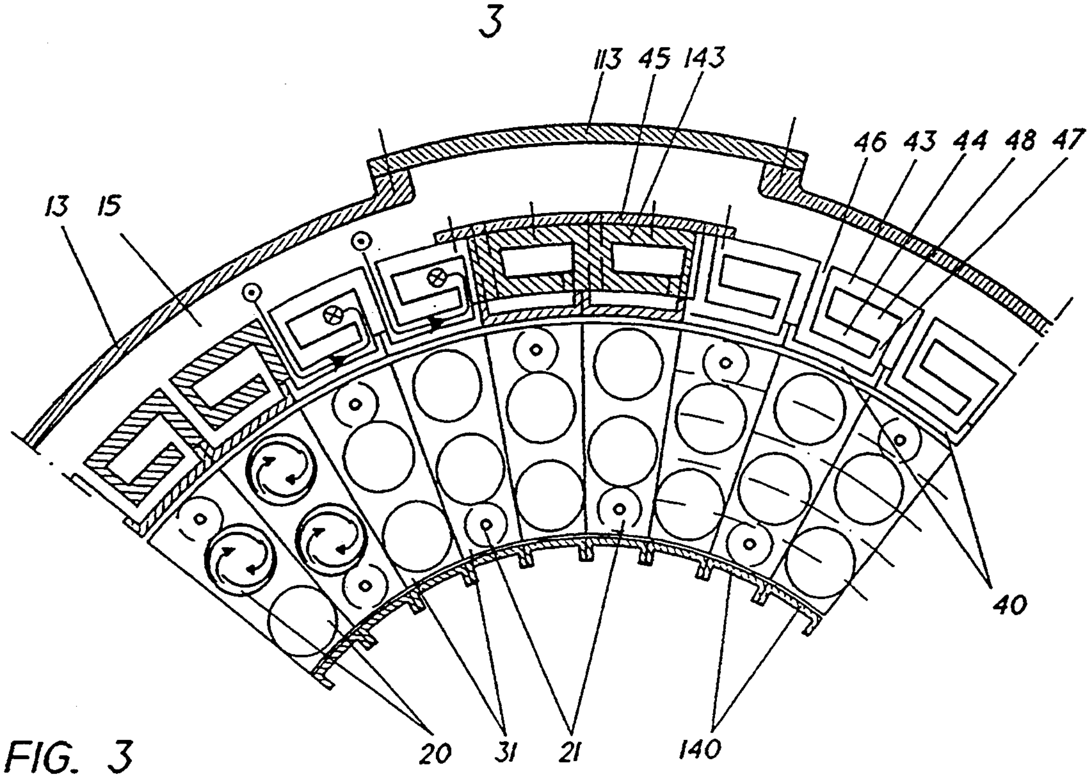
FIG. 3 shows a partial cross section through the primary zone of the combustion chamber along the line 3—3 in FIG. 2.

In this way, three such cooling segments are arranged adjacent to one another in the axial direction (FIG. 2). In the peripheral direction, the number of cooling segments 40 arranged in series corresponds to the number of front segments 31 so that one cooling segment is associated with each front segment and the burner 20 nearest to the wall (FIG. 3).

Each cooling segment is fed with cooling air via a radially directed opening 46 which penetrates the segment carrier 43 and connects the collecting space 15 to an end of the cooling chamber 44 located in the peripheral direction. The outlet opening 47 is located at the opposite end of this same cooling chamber in the segment carrier. Both the opening 46 and the outlet opening 47 can be either individual holes or elongated holes which extend over a major part of the segment width in the axial direction.

The outlet opening 47 opens into a passage 48 which penetrates the segment carrier 43 over its complete axial extent and is open at both ends. At the turbine end, it opens toward the annular space 35 between the double walls of the outer ring 34. As is indicated diagrammatically in FIG. 2, this outer ring is flanged onto the segment carrier, the contour of the inner wall being matched to the contour of the cooling segments. At the burner end, the passage 48 opens toward an inlet space 49, which is bounded by the cover 30 and the front segments 31. The cover 30 is likewise flanged onto the segment carrier 43.

These axial passages 48, of which one is associated with one segment in the peripheral direction, are therefore used for the common guidance of the segment cooling air and the cooling air admitted to the secondary zone.

The same measures are employed for cooling the inner wall of the primary zone, as is indicated in FIG. 3 by means of the cooling segments 140.

The way in which access to the inside of the combustion chamber and, in particular, to the damping tubes of the Helmholtz resonators is made possible, is now represented in FIG. 2 and 3. A part 143 of the upper half of the segment carrier 43, extending over a plurality of cooling segments and forming the manhole mentioned above, together with the cooling segments 40 suspended in it, is designed so that it can be withdrawn. This releasable part 143 of the segment carrier encompasses two cooling segments 40 in the peripheral direction and two in the axial direction (shown shaded in FIGS. 2 and 3). The part 143 closing the manhole is bolted to the segment carrier 43 by means of a strap 45 projecting on all sides. It is evident that a part of the turbine casing 13 corresponding to the size of the manhole must likewise be opened and, in consequence, is designed as a closing cover 113.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas turbine combustion chamber for a stationary power plant, comprising:

a radial inner wall and a radial outer wall an annular combustion space, the walls extending in an axial direction from a combustion chamber inlet to an inlet to a gas turbine;

a front plate at the combustion chamber inlet;

a plurality of burners mounted on the front plate and evenly distributed in a peripheral direction of the combustion chamber inlet; and, a plurality of scavenged Helmholtz dampers for damping thermoacoustic vibrations mounted in proximity to the burners, each Helmholtz damper comprising a resonance volume, a supply tube connecting the resonance volume to a compressed air supply duct, and damping tube connecting the resonance volume to the combustion space, the damping tube permitting a predetermined quantity of air to flow to the combustion space for cooling the resonating chamber.

2. The gas turbine combustion chamber as claimed in claim 1, wherein the damping tubes in the Helmholtz dampers are removably mounted to the resonator volume to allow tuning of individual Helmholtz dampers, the combustion chamber further comprising a manhole through the walls of the combustion space.

3. The gas turbine combustion chamber as claimed in claim 1, wherein the front plate consists of a plurality of front segments arranged in series in the peripheral direction of the combustion chamber inlet as a ring between the radial inner and radial outer walls, wherein two burners are fastened in alignment radially adjacent one another on each front segment and wherein the relative position of the burners on respectively adjacent front segments is alternately radially inward and radially outward, each segment having one of a corresponding radially inward and radially outward space adjacent to the two burners, and wherein the Helmholtz dampers are mounted on the front segments in the adjacent spaces so that the Helmholtz dampers are positioned on adjacent front segments alternately radially outward relative to the burners and radially inward relative to the burners on adjacent front segments.

4. The gas turbine combustion chamber as claimed in claim 2, wherein the walls of the combustion space comprise:

a plurality of segment carriers mounted to form a portion of the walls adjacent to the combustion space inlet defining a primary zone of the combustion space, each segment carrier comprising a radial inner half-shell and a radial outer half-shell defining therebetween an axial passage, a radial opening communicating with the compressed air supply duct to provide cooling air through the radially outer half-shell to the radially inner half-shell, wherein the axial passages of axially adjacent segment carriers form a passage communicating with the combustion chamber inlet;

a plurality of individually cooled cooling segments mounted in the segment carriers and disposed in the combustion space to form an inner surface of the combustion space, the radial opening guiding cooling air to the segment carriers and the axial passage carrying the cooling air from the cooling segment; and, a double-walled flame tube defining an annular flow passage, the flame tube extending axially downstream from the segment carriers to the turbine inlet and bounding a secondary zone of the combustion space, the flame tube having an inlet into the flow passage at the turbine end for cooling air to flow in the annular passage to the primary zone of the combustion chamber, the flow passage communicating with the axial passages in the carrier segments;

wherein the cooling air from the primary zone and the cooling air from the secondary zone are directed to the burner inlet, and wherein at least two adjacent segment carriers are fastened together and releasably mounted in the wall to form an opening to the combustion space.

5. The gas turbine combustion chamber as claimed in claim 6, wherein the cooling segments are arranged in the peripheral direction of the combustion inlet so that one cooling segment corresponds to each of the front segments and wherein at least three cooling segments are arranged adjacent to one another in the axial direction, and wherein the opening to the combustion space includes two cooling segments adjacent in the peripheral direction and two cooling segments adjacent in the axial direction.

* * * * *